INVENTOR.
RALPH F. HOECKELMAN
By Walter P. Wood
Attorney

INVENTOR.
RALPH F. HOECKELMAN
By Walter P. Wood
Attorney

United States Patent Office 3,594,238
Patented July 20, 1971

3,594,238
METHOD FOR TREATING ALUMINUM SURFACES TO PREVENT DISCOLORATION
Ralph E. Hoeckelman, Manor Borough, Pa., assignor to United States Steel Corporation
Filed Aug. 15, 1968, Ser. No. 752,933
Int. Cl. C23f 7/06
U.S. Cl. 148—6.3      5 Claims

ABSTRACT OF THE DISCLOSURE

A method and apparatus for treating an aluminum surface to prevent discoloration of the surface when exposed to boiling water. Particularly applicable to a steel substrate which has a corrosion-resistant aluminum coating. The aluminum surface is exposed to an atmosphere of vapors of a volatile silicon compound and oxygen in a gaseous plasma. A thin protective film of mixed oxides of silicon and aluminum forms on the surface.

---

This invention relates to an improved method and apparatus for treating an aluminum surface to prevent discoloration.

Although my invention is not thus limited, my apparatus and method are particularly useful for treating steel sheets or strip coated with aluminum in a vapor-deposition process. In such processes the steel substrate is placed in a vacuum chamber along with a supply of aluminum and means for heating the aluminum. The aluminum is melted and vaporized and the vapors deposited on the substrate, where they form a corrosion-resistant coating. Reference can be made to Simons Pat. No. 3,046,936 or to Dykeman et al. application Ser. No. 507,103, filed Nov. 10, 1965 (now Patent No. 3,397,672) for more detailed descriptions of typical vapor-deposition processes. One problem is that the aluminum coating tends to become discolored, especially when exposed to boiling water. Food cans made of aluminum coated steel may turn brown or gray when the contents are sterilized, thus making the product less salable. Nevertheless it is apparent my invention can be applied to aluminum surfaces generally.

An object of my invention is to provide a dry treating method and apparatus which effectively prevent discoloration of an aluminum surface on exposure to boiling water or the like.

A further object is to provide an improved method and apparatus for forming on an aluminum surface a protective film of mixed silicon and aluminum oxides, and thereby protecting the surface against discoloration.

A more specific object is to provide a glow-discharge method and apparatus for forming on an aluminum surface a mixed oxide film which is exceedingly thin (usually less than a microinch) and does not itself discolor the surface, yet affords the protection needed.

Figure 1:
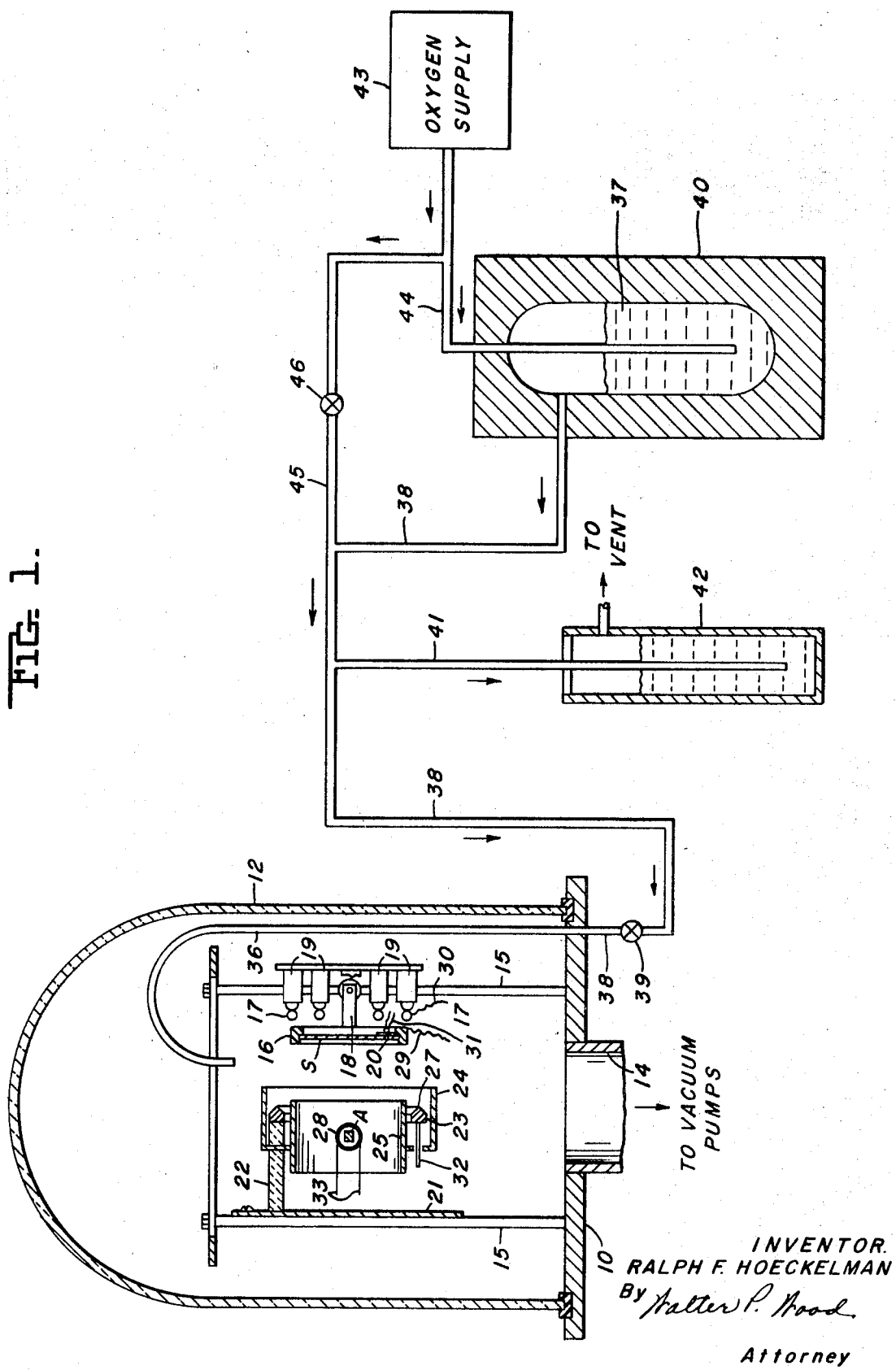
FIG. 1 is a partly diagrammatic vertical sectional view of an apparatus constructed in accordance with my invention for treating individual sheets.

The apparatus of FIG. 1 includes a base 10 and a bell jar 12 supported on the base and sealed at its plane of contact therewith to retain a vacuum. The base has a port 14 to which I connect a vacuum pump (not shown). The base carriers a supporting stand 15 within the bell jar. At one side of the stand I mount a holder 16 and a series of heating coils 17 on insulators 18 and 19 respectively. The holder 16 supports a substrate S, commonly a steel sheet, to be treated in accordance with my invention. I mount a thermocouple 20 on the back of the substrate electrically insulated therefrom. At the other side of the stand 15 I mount a plate 21 which carriers an insulator 22. This insulator in turn carriers a cold-cathode glow-discharge ring 23 and outer and inner concentric annular shields 24 and 25. The glow-discharge ring has a relatively sharp edge 27 facing the substrate. The inner edge of the inner shield 25 extends beyond the sharp edge 27, but not so far as to block any portion of the substrate from exposure to the glow-discharge ring. I mount an evaporation filament 28 within the inner shield 25 on an insulator (not shown). I connect suitably insulated lead wires 29, 30, 31, 32 and 33 to the holder 16, heating coils 17, thermocouple 20, glow-discharge ring 23 and filament 28 respectively.

A gas inlet tube 36 extends upwardly from the base 10, over the stand 15, and downwardly to a position where it can discharge gas over the face of the substrate S. I connect a supply 37 of a volatile liquid silicon compound (preferably $SiCl_4$ or $SiHCl_3$) to the inlet tube 36 through a line 38, which has an adjustable valve 39. The supply 37 is housed within a thermostatically controlled chamber 40 to maintain it at a constant temperature. Line 38 has a branch 41 which leads to non-volatile liquid within a vented chamber 42 for maintaining constant pressure within line 38. I also connect an oxygen supply 43 to the vaporizer 37 via a line 44, and to the line 38 via a line 45, which has a normally closed valve 46.

Figure 2:
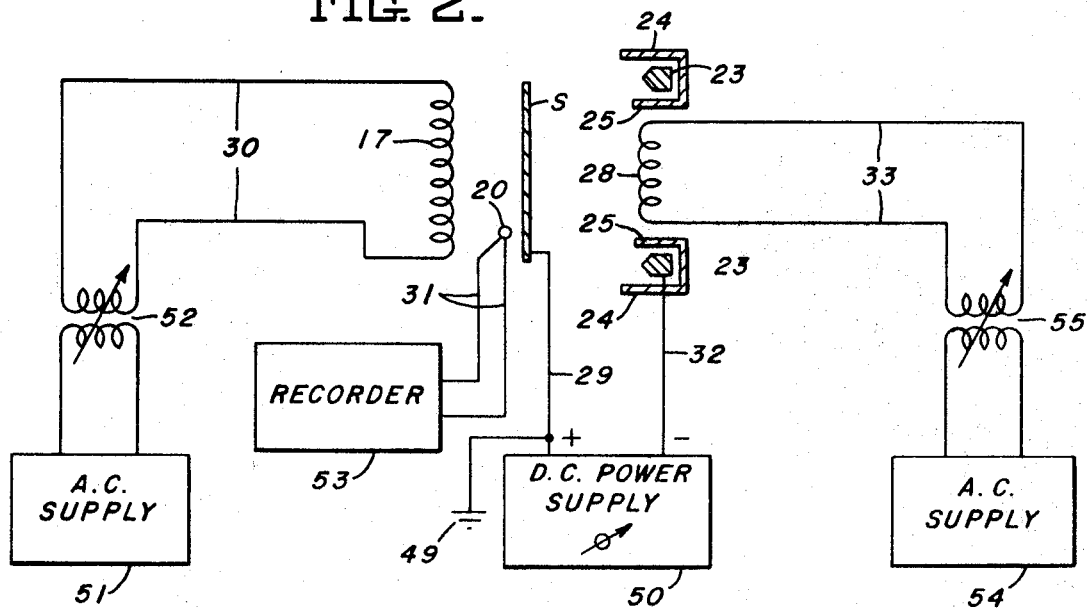
FIG. 2 is a schematic wiring diagram of an electric circuit which I can use in the apparatus shown in FIG. 1.

FIG. 2 shows a schematic wiring diagram for diode operation, in which I connect the lead wire 29 from holder 16 and substrate S to a ground 49 and to the positive side of a D-C power supply 50. I connect the lead wires 30 from the heating coils 17 to an A-C supply 51 through a variable transformer 52. I connect the lead wires 31 from the thermocouple 20 to a recorder 53. I connect the lead wire 32 from the glow-discharge ring 23 to the negative side of the D-C power supply 50. I connect the lead wires 33 from the filament 28 to an A-C supply 54 through a variable transformer 55.

Figure 3:
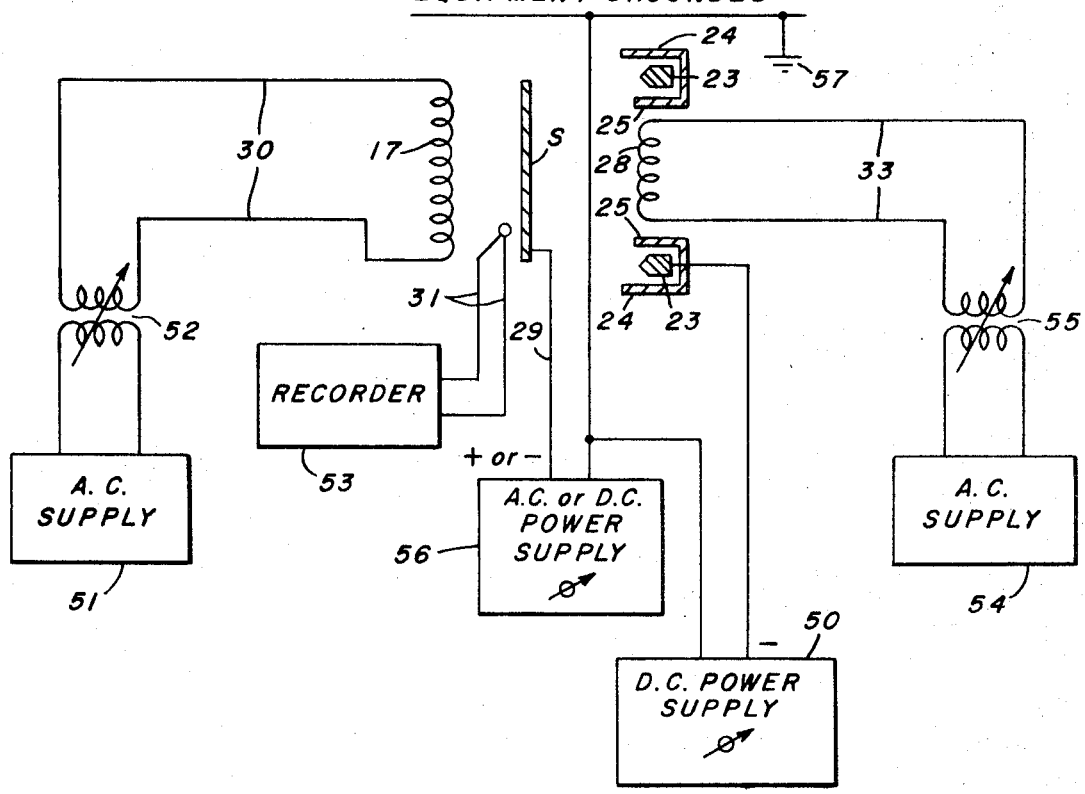
FIG. 3 is a modified schematic wiring diagram.

FIG. 3 shows a schematic wiring diagram for triode operation, in which I connect the lead wire 29 from the holder 16 and substrate S to one side of a power supply 56 (A–C or D–C). I connect the other side of the power supply 56 and one side of the power supply 50 to a ground 57. In other respects the triode circuit is similar to the diode circuit already described; hence I do not repeat the description.

In operation, I mount a substrate S in the holder 16. The substrate must have a clean surface, and if it does not already have an aluminum surface, I mount a charge A of aluminum on the filament 28. The charge is of a mass calculated to produce a coating of a predetermined thickness on the adjacent face of the substrate. I place the bell jar 12 on the base 10 and evacuate it to a pressure of about $10^{-5}$ torr. With valve 39 in the gas line 38 closed, I energize the heating coils 17 to heat the substrate to a proper deposition temperature of about 400 to 700 F., as indicated on recorder 53. I energize the filament 28 to vaporize aluminum charge A, and the vapors condense on the surface of the substrate and form a tightly adhering coating. The plate 21 and inner shield 25 confine the vapors and prevent their spreading to other regions of the bell jar.

Next I deenergize the evaporation filament 28 and adjust the current through the heating coils 17 as needed to bring the substrate S to the proper temperature in the range of about 150 to 700 F. I open valve 39 to admit the treatment atmosphere to the bell jar 12. The treatment atmosphere consists of a mixture of about 10 to 70 mole percent vapors of a silicon compound and the remainder oxygen. At concentrations below 10 percent silicon compound, the treatment is less effective and the film formed is predominantly aluminum oxide. At concentrations above 70 percent silicon compound, there is insufficient oxygen for effective treatment. I maintain the proper concentration by bubbling the oxygen from the supply 43 through the liquid silicon compound supply 37. I hold the supply 37 at a constant temperature which corresponds with the desired vapor pressure of the silicon compound. The pressure in the bell jar may be of any magnitude which sustains a glow discharge, as hereinafter described. The quantity of gas needed for the reaction imposes a practical limit. Pressure below 50 microns requires long treatment times. The optimum pressure is the highest which sustains a stable discharge, commonly 150 to 350 microns.

I energize the glow-discharge circuit from the D-C power supply 50 to form a gaseous plasma between the ring 23 and the substrate S. The latter may be at ground potential (FIG. 2) or it may be biased positively or negatively (FIG. 3). The ring is biased at about 1000 to 5000 volts negative. The current flow is about 30 milliamperes per square inch of substrate surface. I maintain these conditions for about 5 to 20 seconds. A freshly deposited aluminum surface requires only about 5 seconds, which a surface of commercial grade aluminum may require up to about 20 seconds. The treatment forms a thin film of mixed silicon and aluminum oxides on the exposed front face of the substrate.

Figure 4:
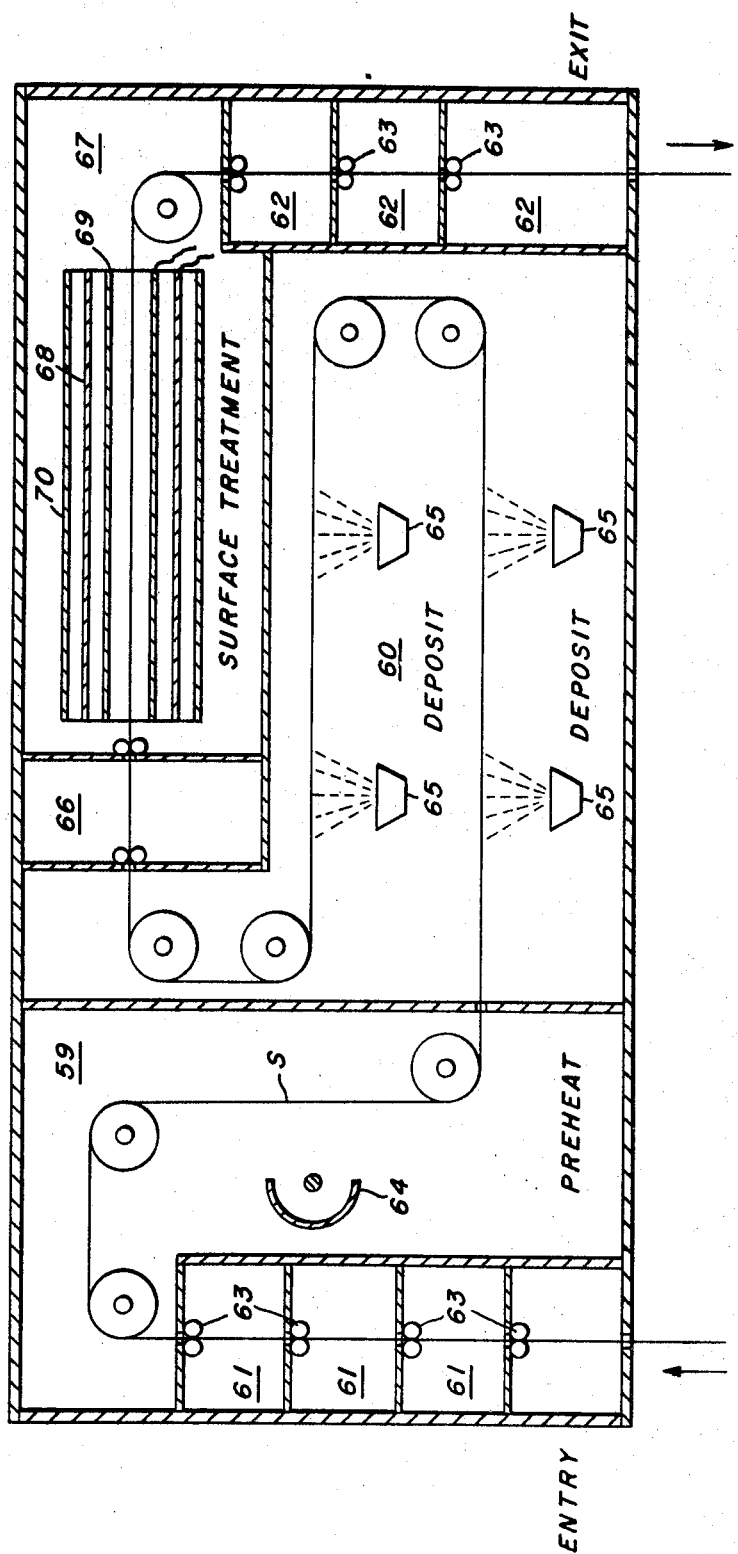
FIG. 4 is a diagrammatic vertical sectional view of an apparatus constructed in accordance with my invention for treating a continuously moving strip.

FIG. 4 shows diagrammatically how I adapt my method and apparatus to the treatment of a substrate S in the form of a continuous strip of steel or other material. The strip passes continuously through a preheating chamber 59 and a vapor-deposition chamber 60, both maintained under a high vacuum. Chamber 59 has a plurality of compartments 61 at its entry end, and chamber 60 has a plurality of compartments 62 at its exit end through which the strip passes in succession. The strip passes between pairs of relatively gas-tight rolls 63 as it enters each compartment. The pressure is progressively lower in each succeeding entry compartment 61, reaches a minimum in chambers 59 and 60, and is progressively higher in each succeeding exit compartment 62. The preheating chamber 59 contains heating devices 64, and the vapor-deposition chamber 60 contains aluminum-supplying crucibles 65 and conventional means (not shown) for vaporizing the aluminum. Reference can be made to the aforementioned Dykeman et al. application for a more complete showing of apparatus of this type.

In accordance with my invention, the deposition chamber 60 has a pressure-adjusting compartment 66 and a surface-treatment compartment 67 ahead of the first exit compartment 62. Compartment 67 houses a pair of cathode grids 68 on opposite sides of strip S, a pair of anode grids 69 between the respective cathode grids and the strip, and a pair of electron shields 70 outside the respective cathode grids. The cathode grids correspond with the glow-discharge ring 23 of FIG. 1, and I connect them in an energizing circuit in like manner. For diode operation I may remove or ground the anode grids. For triode operation I ground the substrate and I connect the anode grids to the positive terminal of the plasma power supply. I admit an atmosphere of similar composition and of similar pressure to that described in connection with FIG. 1. The grids establish a plasma, which forms a protective film on the strip in the same manner. As the strip leaves the deposition chamber and passes through compartments of increasing pressure, it automatically comes to the optimum pressure for my surface treatment.

In either instance the product which results from my treatment bears a surface film of mixed silicon and aluminum oxides of a thickness less than one microinch. The film is formed dry in a vacuum, whereby the treatment advantageously can be applied in conjunction with a vapor-deposition process. The coating is not exposed to oxidizing conditions until it has undergone my surface treatment, which does not itself discolor the surface. Consequently the surface retains its original bright luster of freshly deposited aluminum, yet is protected from discoloration otherwise caused by exposure to boiling water or the like. My invention is not to be confused with treatments in which vapors of silicon and aluminum are deposited simultaneously on a steel substrate and oxidized to produce a much thicker oxide coating. Such coatings are intended to enhance the corrosion resistance over an aluminum coating alone, but produce a visibly duller surface.

I claim:

1. A method of treating an aluminum surface to prevent discoloration of the surface on exposure to boiling water or the like, said method comprising exposing the surface to a glow discharge from a cathode in an atmosphere which consists of about 10 to 70 mole percent vapors of a volatile silicon compound and the remainder substantially oxygen at a pressure of about 50 to 350 microns.

2. A method as defined in claim 1 in which the aluminum surface is on an aluminum coated steel substrate, and the treating method follows directly the application of the aluminum coating.

3. A method as defined in claim 2 in which the aluminum coating is applied in a vapor-depositon process.

4. A method as defined in claim 1 in which the substrate is a continuous strip.

5. A method as defined in claim 1 in which the treatment forms on the aluminum surface a film of a thickness less than one microinch and consisting of mixed oxides of silicon and aluminum.

References Cited
UNITED STATES PATENTS

| | | | |
|---|---|---|---|
| 3,252,830 | 5/1966 | Cummin et al. | 117—93.1X |
| 3,419,487 | 12/1968 | Robbins et al. | 117—106A |
| 3,437,511 | 4/1969 | Hough | 117—106X |

ALFRED L. LEAVITT, Primary Examiner

J. H. NEWSOME, Assistant Examiner

U.S. Cl. X.R.

117—93.1, 106, 107, 107.1, 118